US012692332B2

(12) United States Patent
He et al.

(10) Patent No.: US 12,692,332 B2
(45) Date of Patent: Jul. 28, 2026

(54) OLEOPHOBIC FLUOROPOLYMERS AND FILTER MATERIALS PREPARED THEREFROM

(71) Applicant: ENTEGRIS, INC., Billerica, MA (US)

(72) Inventors: Mei Feng He, Hangzhou (CN); Dongzhu Wu, Hangzhou (CN); Yunjia Xia, Hangzhou (CN); Kwok-Shun Cheng, Nashua, NH (US)

(73) Assignee: Entegris, Inc., Billerica, MA (US)

( * ) Notice: Subject to any disclaimer, the term of this patent is extended or adjusted under 35 U.S.C. 154(b) by 853 days.

(21) Appl. No.: 17/847,088

(22) Filed: Jun. 22, 2022

(65) Prior Publication Data

US 2023/0026572 A1 Jan. 26, 2023

Related U.S. Application Data

(63) Continuation of application No. PCT/CN2021/102859, filed on Jun. 28, 2021.

(51) Int. Cl.

| | |
|---|---|
| ***C08F 214/18*** | (2006.01) |
| ***B01D 67/00*** | (2006.01) |
| ***C08F 218/08*** | (2006.01) |
| ***C08F 220/14*** | (2006.01) |
| ***C08F 220/18*** | (2006.01) |
| ***C08K 5/14*** | (2006.01) |

(52) U.S. Cl.

CPC ...... *C08F 214/182* (2013.01); *B01D 67/0088* (2013.01); *C08F 220/1804* (2020.02); *C08K 5/14* (2013.01); *B01D 2239/0478* (2013.01); *C08F 218/08* (2013.01); *C08F 220/14* (2013.01)

(58) Field of Classification Search

None

See application file for complete search history.

(56) References Cited

U.S. PATENT DOCUMENTS

| | | | | |
|---|---|---|---|---|
| 5,262,096 | A | 11/1993 | Egashira | |
| 5,342,434 | A | 8/1994 | Wu | |
| 5,559,192 | A | 9/1996 | Bors | |
| 6,020,435 | A | 2/2000 | Blankenship | |
| 6,489,417 | B1 * | 12/2002 | Samukawa | C08F 20/22 524/544 |
| 6,582,113 | B2 | 6/2003 | Rogers | |
| 9,364,796 | B2 | 6/2016 | Wünn | |
| 2004/0037967 | A1 * | 2/2004 | Feiring | C09D 127/12 427/409 |
| 2010/0024651 | A1 | 2/2010 | Bansal | |
| 2014/0018492 | A1 * | 1/2014 | Imahori | C08F 214/18 524/544 |
| 2016/0075915 | A1 | 3/2016 | Dutta | |
| 2016/0237614 | A1 | 8/2016 | Kawabe | |

FOREIGN PATENT DOCUMENTS

| | | | | |
|---|---|---|---|---|
| CN | 1072561 | C | 10/2001 | |
| CN | 100496683 | C | 6/2009 | |
| CN | 101638054 | A | 2/2010 | |
| CN | 101797804 | A * | 8/2010 | B29C 70/443 |
| CN | 103572604 | A | 2/2014 | |
| CN | 104448098 | A * | 3/2015 | |
| CN | 101797804 | B | 5/2015 | |
| CN | 104844759 | A * | 8/2015 | |
| CN | 104448098 | B | 4/2016 | |
| CN | 105705536 | A | 6/2016 | |
| CN | 104204054 | B | 7/2016 | |
| CN | 106279518 | A | 1/2017 | |
| CN | 111511460 | A | 8/2020 | |
| CN | 109422850 | B | 7/2021 | |
| EP | 0298174 | A1 * | 1/1989 | C08F 220/24 |
| JP | 2001302732 | A | 10/2001 | |
| JP | 2005082719 | A | 3/2005 | |
| TW | 201132653 | A | 10/2011 | |
| WO | 2011034782 | A1 | 3/2011 | |
| WO | 2014021106 | A1 | 2/2014 | |

OTHER PUBLICATIONS

US 10,518,225 B2, 12/2019, Onyemauwa (withdrawn)

Qi, P. et al., "Preparation and Application of Fluoro Resin". Huaxue Shijie, 2009, 50(3), 146-148, 142. (Year: 2009).*

Boyes, S. G. et al., "Characterization of Stimuli-Responsive Semifluorinated Polymer Brushes". Polymer Preprints, 2003, 44(1), 506-507. (Year: 2003).*

American Association of Textile Chemists and Colorists, AATCC 118: Oil Repellency: Hydrocarbon Resistance Test, 1997, 191-193.

Gore Materials Technology, Venting With Hydrophobic vs. Oleophobic Membranes, 2011, W. L. Gore & Associates, Inc., US (2 pages).

Jiang Guancheng, Theoretical Basis and Application of Gas Wettability on Rock Surface in Porous Media Oil Gas Reservoirs, China University of Petroleum Press, pp. 196, 2015.

Chinese Office Action issued May 10, 2026 in application No. 202180100727.5 and English translation of same, which provides a concise explanation of relevance for NPL 1, Jiang Guancheng, above, 10 pages.

* cited by examiner

*Primary Examiner* — Richard A. Huhn

(57) ABSTRACT

The disclosure provides an improved process for preparing oleophobic fluoropolymers. The resulting fluropolymers were found to be effective in imparting hydrophobic and oleophobic properties to porous polymeric membranes such as PTFE. The treated PTFE membrane can reach an oleophobic level of 6 or above, (according to the AATCC-118-1997 oil repellency test method) with a low air flux loss.

12 Claims, No Drawings

OLEOPHOBIC FLUOROPOLYMERS AND FILTER MATERIALS PREPARED THEREFROM

CROSS-REFERENCE TO RELATED APPLICATIONS

This application is a continuation application under 35 U.S.C. 111(a) claiming priority under 35 U.S.C. 120 to International Application No. PCT/CN2021/102859, filed Jun. 28, 2021, the disclosure of which is hereby incorporated herein by reference in its entirety.

TECHNICAL FIELD

The disclosure relates to methodology for preparing oleophobic polymers, which are useful in imparting oleophobic coatings to filter materials, such as those comprised of porous membranes.

BACKGROUND

Most of the housings of electronic equipment such as automobile lights, electric razors, and electric toothbrushes are designed with vents. The purpose of the vent is to extend the service life of the equipment by eliminating the internal and external pressure imbalance caused by thermal expansion and contraction inside the equipment by balancing the internal and external atmospheric pressure. In order to prevent water, dust, oil vapor, etc., from entering through the vents of the equipment housing, poly(tetrafluoroethylene) microporous membranes (PTFE membranes) are often used as venting filter materials.

The PTFE membrane itself has excellent hydrophobicity. However, in some applications, the breathable membrane at the vent will inevitably be in contact with low surface tension substances such as lipids, surfactants, and oils. In these circumstances, a PTFE membrane alone often cannot prevent the undesired intrusion of such substances. Accordingly, there is a need to achieve enhanced oleophobic and hydrophobic properties for venting membranes, such as PTFE venting membranes.

It is known that fluoropolymers which contain a linear perfluoroalkyl group with 8 or more fluorocarbon atoms (C8) can impart excellent water and oil repellency to materials. Existing synthetic methodology includes (1) a method of obtaining a fluorine-containing acrylate polymer by emulsion polymerization and (2) a method of preparing a fluoropolymer via a polycondensation reaction between polyisocyanate groups and fluorine-containing monomers with polyhydroxyl groups (See, for example, U.S. Pat. No. 5,342,434). However, one difficulty is that with such fluoropolymers having sufficiently high fluorine content so as to impart good oleophobic and hydrophobic properties also suffer from poor solubility in non-fluorinated solvents.

Additionally, due to the high inherent hydrophobicity of the PTFE membrane, existing fluorine-containing polymer emulsions cannot completely wet the PTFE membrane; consequently, the PTFE membrane cannot be modified uniformly and effectively (i.e., coated) to increase the oleophobicity of the membrane. Moreover, the polymerization reaction between isocyanate group(s) and fluorinated monomer(s) with hydroxyl group(s) is difficult to scale up, since the reaction is typically a bulk polymerization and the reaction product tends to adhere to the reaction wall and the stirring blade, thus making it difficult to efficiently remove and isolate the reaction product from the reactor. Additionally, isocyanate-based compounds present other concerns such as toxicity and potential damage to the environment.

SUMMARY

The present disclosure provides an improved process for preparing oleophobic fluoropolymers. Advantageously, the process can be readily scaled-up and can provide high yields. The resulting fluropolymers were found to be effective in imparting oleophobic properties to polymers such as PTFE, and accordingly provide methodology for improving the oil repellency of filter materials such as membranes comprising PTFE. Moreover, the fluoropolymer compositions of the disclosure are useful in imparting good hydrophobic and oleophobic properties to materials, while allowing the passage of air through the materials. Coated materials such as porous membranes and fabrics, including woven and nonwoven fibrous materials, which often are utilized within a filter structure, are useful in applications where resistance to penetration by water, oil, or lipid emulsions ae desired. These applications include breathable fabrics and gas vents or filters. Gas vents or filters are often used to protect electronic equipment in, for example, automotive, industrial, and medical device applications.

One key difficulty in the utilization of long linear perfluoro monomers lies in their limited solubility. In this improved process, we discovered that the utilization of solvents having ester moieties in a free radical co-polymerization of (per)fluorine-containing monomers and fluorine-free monomers, such as acrylics, provides fluoropolymers in high yields and whose isolation is not fraught with the difficulties discussed above, while at the same time providing a highly useful fluoropolymer which can be easily dissolved in, for example, trifluorotoluene or butyl acetate. Advantageously, we also discovered that the utilization of certain acrylic monomers in conjunction with high fluorine-containing monomers in a polymerization with ester solvents provided fluoropolymers with high fluorine content, which were excellent polymers for oleophobic and hydrophobic modification of filter membranes.

The resulting fluoropolymer reaction product can be diluted with additional solvent(s), or can be directly used for uniform, oil-repellent modification of, for example, PTFE membranes. The experimental results show that the treated PTFE membrane can reach an oleophobic level of 6 or above, (according to the AATCC-118-1997 oil repellency test method) with a low air flux loss.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

In a first aspect, the disclosure provides a process for preparing a fluoropolymer, comprising the free-radical polymerization of mono-ethylenically unsaturated monomers, which comprises combining:

a. about 60 to about 100 weight percent of a fluorine-containing monoethylenically-unsaturated monomer; and b. about 0 to about 40 weight percent of a fluorine-free monoethylenically-unsaturated monomer;

under free-radical polymerization conditions, in a solvent comprising at least one solvent having ester moieties, wherein the total weight percent of a. and b. is 100, and allowing the polymerization to proceed to a desired end point.

In certain embodiments, the fluorine-containing monoethylenically-unsaturated monomer (a.) will be present in the reaction mixture in an amount of about 70 to 100 weight percent, about 80 to 100 weight percent, or about 90 to about 98 weight percent, with the remainder comprising the fluorine-free monoethylenically-unsaturated monomer, and adding up to 100 weight percent total of monoethylenically-unsaturated monomers. In further embodiments, the fluorine-containing monoethylenically-unsaturated monomers and the fluorine-free monoethylenically-unsaturated monomers will be devoid of halogen atoms chosen from bromo, chloro, and iodo. In further embodiments, the fluorine-free monoethylenically-unsaturated monomers are free of cycloaliphatic groups and aryl groups. In further embodiments, the fluorine-free monoethylenically-unsaturated monomers are free of nitrogen atoms.

The process of the disclosure is typically conducted at temperatures at or above room temperature. In certain embodiments, the polymerization is conducted at a temperature of from about 20° C. to about 150° C., or about 40° C. to about 120° C.

In this disclosure, free-radical polymerization conditions are those conditions which provide sufficient free-radical flux in the reaction mixture to effect polymerization of the fluorine-containing and fluorine-free monoethylenically-unsaturated monomers. Such free radicals can be generated in solution via application of appropriate thermal or irradiation conditions such as, for example, ultraviolet radiation or electron beam radiation. Alternately, and advantageously, the free-radical flux may be effected by initiators known to those skilled in the art of free-radical polymerization. In one embodiment, such initiators can be chosen from hydrogen peroxide, potassium peroxydisulfate, ammonium peroxydisulfate, potassium persulfate, sodium persulfate, ammonium persulfate, dibenzoyl peroxide, lauryl peroxide, di-tertiary butyl peroxide, 2,2'-azobisisobutyronitrile (or 2,2'-azobis(2-methylpropionitrile) also known as AIBN), t-butyl hydroperoxide, azodiisobutylamidine hydrochloride, and benzoyl peroxide.

Thus, in another embodiment, the disclosure provides a process for preparing a fluoropolymer, comprising the free-radical polymerization of mono-ethylenically unsaturated monomers, which comprises combining:

a. about 60 to about 100 weight percent of a fluorine-containing monoethylenically-unsaturated monomer;

b. about 0 to about 40 weight percent of a fluorine-free monoethylenically-unsaturated monomer; under free-radical polymerization conditions, c. and at least one free-radical initiator, in a solvent comprising at least one solvent having ester moieties, wherein the total weight percent of a. and b. is 100, and allowing the polymerization to proceed to a desired end point.

In certain embodiments, the fluorine-containing monoethylenically-unsaturated monomer is chosen from (a) acrylates, (b) ($C_1$-$C_{14}$ alkyl)acrylates, and (c) vinyl esters, having from about 3 to about 33 fluorine atoms.

In other embodiments, the fluorine-containing monoethylenically-unsaturated monomer will have from 8 to 20 fluorine atoms. In other embodiments, the fluorine-containing monoethylenically-unsaturated monomer is a perfluorinated alkane having one olefinic (i.e., double) bond.

In one embodiment, the fluorine-containing monoethylenically-unsaturated monomer has the formula

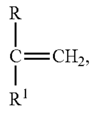

wherein R is chosen from hydrogen or an alkyl group of up to 18 carbon atoms, and $R^1$ is chosen from groups of the formulae:

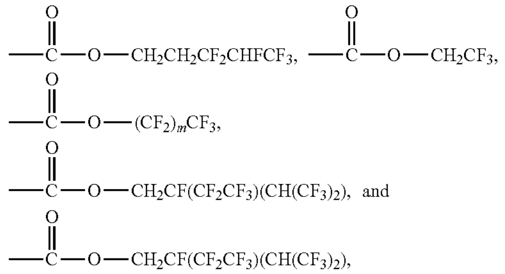

and wherein m is 3, 5, 7, 9, 11, 13, or 15.

In another embodiment, the fluorine-containing monoethylenically-unsaturated monomer is chosen from one or more of perfluorooctyl ethylene, perfluorononyl ethylene, perfluorodecyl ethylene, perfluorododecyl ethylene, perfluorotetradecyl ethylene, perfluorohexadecyl ethylene, 2-(perfluorooctyl)ethyl acrylate, 2-(perfluorononyl)ethyl acrylate, 2-(perfluorodecyl)ethyl acrylate, 2-(perfluorododecyl)ethyl acrylate, 2-(perfluorotetradecyl)ethyl acrylate, 2-(perfluorohexadecyl)ethyl acrylate, 2-(perfluorooctyl)ethyl methacrylate, 2-(perfluorononyl)ethyl methacrylate, 2-(perfluorodecyl)ethyl methacrylate, 2-(perfluorododecyl)ethyl methacrylate, 2-(perfluorotetradecyl)ethyl methacrylate, 2-(perfluorohexadecyl)ethyl methacrylate, and the like.

The CAS numbers for exemplary fluorine-containing monoethylenically-unsaturated monomers are listed in the following table:

| Chemical Name | Chemical Abstract Number (CAS No.) |
|---|---|
| 1H,1H,2H-heptadecafluoro-1-decene | 21652-58-4 |
| Perfluorodecyl ethylene | 30389-25-4 |
| (Perfluorododecyl)ethylene | 67103-05-3 |
| 1H,1H,2H,2H-heptadecafluorodecyl methacrylate | 1996-88-9 |
| 1H,1H,2H,2H-Heptadecafluorodecyl Acrylate | 27905-45-9 |
| 1,1,2,2-Tetrahydroperfluorotetradecyl acrylate | 34395-24-9 |

-continued

| Chemical Name | Chemical Abstract Number (CAS No.) |
|---|---|
| 1,1,2,2-Tetrahydroperfluorododecyl methacrylate | 2144-54-9 |
| 2-(Perfluoroalkyl)ethyl methacrylate | 65530-66-7 |
| Perfluoroalkyl ethyl acrylate | 65605-70-1 |
| Perfluoroalkyl ethylene | 97659-47-4 |
| Perfluorooctyl ethylene | 21652-58-4 |
| perfluorotetradecyl ethylene | 97659-47-7 |
| 2-(perfluorooctyl)ethyl acrylate | 17527-29-6 |
| 2-(perfluorododecyl)ethyl acrylate | 17741-60-5 |
| 2-(perfluorooctyl)ethyl methacrylate | 1996-88-9 |
| 2-(perfluorododecyl)ethyl methacrylate | 6014-75-1 |
| 2-(perfluorotetradecyl)ethyl methacrylate | 2144-54-9 |
| 2-(perfluorooctyl)ethyl acrylate | 27905-45-9 |

In another embodiment, the fluorine-containing monoethylenically-unsaturated monomer is chosen from 2-(perfluorooctyl) ethyl acrylate, perfluorononyl ethyl acrylate, perfluorododecyl ethyl acrylate, perfluorotetradecyl ethyl acrylate, perfluorohexadecyl ethyl acrylate, perfluorooctyl ethyl methacrylate, perfluorononyl ethyl acrylate methyl methacrylate, perfluorododecyl ethyl methacrylate, and perfluoro hexadecyl ethyl methacrylate.

In another embodiment, the fluorine-containing monoethylenically-unsaturated monomer comprises, consists, or consists essentially of 2-(perfluorooctyl) ethyl acrylate.

In one embodiment, the fluorine-free monoethylenically-unsaturated monomer is chosen from compounds of the formulae (A)

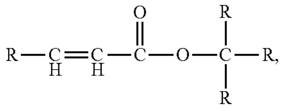

and (B)

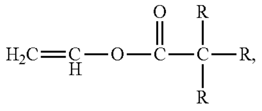

wherein each R is independently chosen from hydrogen or an alkyl group of up to 18 carbon atoms.

Compounds of Formula (A) will be recognized as representing acrylates and (alkyl)acrylates and compounds of Formula (B) will be recognized as representing certain vinyl compounds, i.e., vinyl esters.

In another embodiment, the fluorine-free monoethylenically-unsaturated monomer is chosen from compounds having an olefinic double bond, in certain cases attached directly attached to an aromatic ring. Examples of such compounds are styrene and α-methyl styrene. Alternatively, the olefinic double bond may be substituted with an alkoxycarbonyl group such as the case with di-n-butyl maleate. In other embodiments, the fluorine-free monoethylenically-unsaturated monomer may be those vinyl and acrylate compounds having one or more nitrogen atoms, such as hydroxyethyl acrylamide. In other embodiments, the fluorine-free monoethylenically-unsaturated monomers and/or the fluorine-containing monoethylenically-unsaturated monomers exclude those monomers containing a nitrogen atom.

In one embodiment, the fluorine-free monoethylenically-unsaturated monomer is chosen from methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methyl styrene, glycidyl methacrylate, alkyl crotonates, vinyl acetate, vinyl caprylate, di-n-butyl maleate, di-octylmaleate, hydroxyethyl acrylamide, hydroxypropyl methyl acrylamide, and the like.

In one embodiment, the fluorine-free monoethylenically-unsaturated monomer is chosen from methyl methacrylate, ethyl methacrylate, propyl methacrylate, butyl methacrylate, vinyl acetate, vinyl butyrate, and vinyl caprylate.

As used herein, the "solvent having ester moieties" is understood to be a solvent having at least one moiety such as

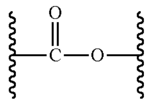 [SMILES: *OC(*)=O]

within the molecule.

In one embodiment, the solvent having ester moieties is chosen from compounds of the formula:

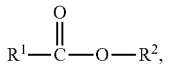

wherein $R^1$ and $R^2$ are independently chosen from (a) $C_1$-$C_{12}$ alkyl, and (b) $C_1$-$C_{12}$ alkyl groups substituted one or more times with a group chosen from halo, nitro, cyano, and alkoxy.

In one embodiment, the solvent having ester moieties is chosen from methyl acetate, ethyl acetate, propyl acetate, and butyl acetate.

As noted above, the fluoropolymers disclosed herein are particularly suitable for coating porous polymeric membranes, in particular those which are hydrophobic, such as PTFE. The physical properties of the fluoropolymers of the disclosure enable their dissolution in appropriate solvents and application to such porous polymeric membranes, and in so doing, at least partially coat the membrane and consequently enhance the overall oleophobic and hydrophobic qualities of the membrane. Additionally, the fluoropolymers of the disclosure can be used to coat woven and non-woven fibrous materials, for example such materials that are used in textiles and filter materials, thus enhancing the oleophobic and hydrophobic qualities of such materials. Accordingly, in a further aspect, the disclosure provides a fluoropolymer prepared by the process of the disclosure. In a further embodiment, the disclosure provides a fluoropolymer which is the free radical polymerization product of monomers comprising:

a. fluorine-containing monoethylenically-unsaturated monomers chosen from: 2-(perfluorooctyl) ethyl acrylate, perfluorononyl ethyl acrylate, perfluorododecyl ethyl acrylate, perfluorotetradecyl ethyl acrylate, perfluorohexadecyl ethyl acrylate, perfluorooctyl ethyl methacrylate, perfluorononyl ethyl acrylate methyl methacrylate, perfluorododecyl ethyl methacrylate, and perfluoro hexadecyl ethyl methacrylate;
b. and fluorine-free monoethylenically unsaturated monomers chosen from: methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methyl styrene, glycidyl methacrylate, alkyl crotonates, vinyl acetate, vinyl caprylate, di-n-butyl maleate, and dioctylmaleate.

In this aspect, the monomers utilized in the preparation of the fluoropolymers may comprise, consist of, or consist essentially of the recited monomers above. As a general convention throughout this disclosure, the process, the composition as described, or an ingredient or component thereof, that is said to "consist essentially of" a group of specified ingredients or materials refers to a composition that contains the specified ingredients or materials with not more than a low or insignificant amount of other ingredients or materials, e.g., not more than 5, 2, 1, 0.5, 0.1, or 0.05 weight percent of other ingredients or materials.

In certain embodiments of the process and compositions of the disclosure, the monomers are devoid of species containing halogen atoms other than fluorine, i.e., chloro, bromo, or iodo. As used herein, "devoid" refers to a quantity which is not more than 2, 1, 0.5, 0.1, or 0.5 weight percent, based on the total weight of monomers utilized.

In one embodiment, the fluoropolymers of the invention are utilized to coat filter materials, i.e., components of filters such as vent filters. Thus, in another aspect, the disclosure provides filters having oleophobic and hydrophobic filtration capabilities. To perform a filtration function, such filters include the filter membranes of the disclosure, which are responsible for removing unwanted material from a gas which passes through the filter. The membranes within the filters may, as required, be in the form of a flat sheet, which may be wound (e.g., spirally), flat, pleated, or disc-shaped. The filter membrane may alternatively be in the form of a hollow fiber. The filter containing the membrane may be contained within a housing or otherwise supported so that the gas which is being filtered enters through a filter inlet and is required to pass through the filter and membrane before passing through the filter outlet.

The membranes of the disclosure can be constructed of a porous structure that has average pore sizes that can be selected based on the use of the filter, i.e., the type of filtration performed by the filter. Typical pore sizes are in the micron or sub-micron range, such as from about 0.001 micron to about 10 μm. Membranes with average pore size of from about 0.002 to about 0.1 micron are sometimes classified as ultrafilter membranes. Membranes with pore sizes between about 0.1 and 50 μm are sometimes referred to as microporous membranes. In one embodiment, the membranes comprise hydrophobic and/or oleophobic polymers. In one embodiment, the membranes comprise poly (tetrafluorethylene), i.e., PTFE.

Thus, in another aspect, the disclosure provides a membrane having at least a partial coating of a fluoropolymer thereon, wherein the membrane has an air flux of no less than 0.1 L/minute per 0.5024 $cm^2$ at a pressure of 10 KPa, and an oil rating according to AATCC Test method 228-1997 of greater than about 6. In one embodiment, the membrane is a poly(tetrafluoroethylene). In another embodiment, the membrane exhibits an oil rating of about 7 to about 8. In another embodiment, the membrane is coated with the fluoropolymer prepared by the first aspect as set forth above.

In one embodiment, the filters and the membranes of the invention are useful as vent filters. As noted above, vent filters are utilized in many electronic devices, both to allow for internal and external pressures to equalize, as well as to protect internal components from deleterious effects potentially brought on by exposure to water vapor and oil vapor.

As provided by the present disclosure, the fluoropolymers are useful in providing a coating to existing polymeric membranes to improve the membrane's inherent hydrophobic and oleophobic performance. In particular, these fluoropolymers, dissolved in an appropriate solvent, can be used to apply a coating to a polymeric membrane such as a poly(tetrafluroethylene) membrane, thereby improving its hydrophobic and oleophobic performance. As such, the fluoropolymer coated membranes of the disclosure are particularly useful in those end use applications which require oleophobicity and hydrophobicity. Additionally, the membranes of the invention are suitable for forming part of a filter. Accordingly, in another aspect, the disclosure provides a filter comprising the membranes of the disclosure as set forth herein.

Given the improved hydrophobic and oleophobic performance that the fluoropolymers of the invention impart to polymeric membranes such as PTFE, these fluoropolymer-coated membranes can be advantageously utilized to remove water and oily materials from a gaseous flow, such as air. Thus, in a further aspect, the disclosure provides a method for purifying a gas, which comprises passing a gas in need of purification through the filter of the disclosure. In one embodiment, this purification comprises the removal of at least a portion of the water and/or oil vapor in the gaseous stream.

The membranes of the invention, which are porous polymeric membranes which have been at least partially coated with the fluoropolymers of the disclosure, can be readily prepared by dissolving the fluoropolymer prepared in the first aspect, and further dissolving the fluoropolymer solution with solvents such as ethyl acetate, toluene, trifluorotoluene, and monofluorochloroethane, and mixtures thereof. In one embodiment, the diluting solvent is trifluorotoluene. The solution containing the fluoropolymer can then be sprayed onto the membrane or the membrane simply physically dipped into the solution, and thereafter allowed to dry or otherwise drive off the solvent, thereby leaving a highly oleophobic and hydrophobic coating on the underlying porous polymer membrane. Woven and nonwoven fibrous materials may be coated in the same manner. In this fashion, a porous polymeric membrane, such as poly(tetrafluoroethylene) (PTFE) which is inherently somewhat oleophobic and hydrophobic, can be enhanced in such qualities and performance.

EXAMPLES

Air Flux Test

The air flux was measured by an in-house testing device. The results are reported in terms of air flux which represents the passage of air at a rate of liters (L) per minute for an effective membrane area of 0.5024 square centimeter test sample, at a pressure of 10 KPa. A Rotameter flowmeter was utilized to measure the resulting air flow.

Oil Rating Data

Oil rating data was obtained by AATCC Test Method 118-1997. In this test method, the higher the number, the better the oil repellency

Example 1

90 g of perfluorooctyl ethyl acrylate, 10 g of butyl methacrylate, 1 g of benzoyl peroxide (BPO) as an initiator, and 300 g of butyl acetate as solvent were added into a three-neck round-bottom flask fitted with a mechanical stirrer under a nitrogen atmosphere. The above reagent mixture was heated to 70° C. and reacted for 16 hours.

When cooled to room temperature, the fluoropolymer was diluted with trifluorotoluene as a diluent to a weight concentration of 3% as an oleophobic modification agent. A sheet of PTFE composite membrane made by Donaldson Company (product model TX6522, size 6 cm*26 cm) was dipped it into the modification reagent for 3 minutes and then taken out for air drying overnight. Oleophobic and air flux data are shown in Table 1 below.

Example 2

60 g of perfluorooctyl ethyl acrylate, 40 g of dodecyl methacrylate, 1 g of benzoyl peroxide (BPO) as an initiator, and 300 g of butyl acetate as a solvent was added into a three-neck round-bottom flask fitted with a mechanical stirrer under a nitrogen atmosphere. The above reagent mixture was heated to 110° C. and reacted for 16 hours.

When cooled to room temperature, the fluoropolymer was diluted with a mixture solvent of monofluorodichloroethane and butyl acetate 1:1 by weight to a weight concentration of 3% as an oleophobic modification agent. A sheet of PTFE composite membrane made by Donaldson Company (product model TX6522, size 6 cm*26 cm) was dipped into the modifier reagent for 3 minutes. The coated membrane was taken out, air dried for 1 hour, and then dried in an oven at 70° C. for 10 minutes. Oleophobic and air flux data are shown in Table 1 below.

Comparative Example 1—(Non-Ester Solvent)

An oleophobic fluoropolymer was prepared in accordance with the teaching in U.S. Pat. No. 5,342,434:

5.10 g of methylene di-p-phenyl diisocyanate and 20.56 g of perfluoroalkyl ethyl alcohol (Zonyl BA-N, from DuPont) were placed in a vial, heated to 120° C., and kept at 120° C. with stirring for 1 hour followed by heating to 190° C. for another hour. When cooled to room temperature, the reaction product became a brown solid. Melting temperature of the reaction product was in the range of 150° to 180° C. as determined by differential scanning calorimetry (DSC) at a rate of 10° C. increase/minute in air. 1 gram of the reaction product was dissolved in 20 grams of tetrahydrofuran at 50° C. Sheets of expanded porous PTFE (ePTFE) of pore size described further below (obtained from W. L. Gore & Associates, Inc.) were dipped in the resulting solution for a time sufficient to produce a desired "add-on" amount of coating, i.e., utilizing the coating methodology of Example 1. Oleophobic and air flux data are shown in Table 1 below.

Comparative Example 2 (Non-Ester Fluoropolymer Diluent)

An oleophobic fluoropolymer was prepared in accordance with the teaching in U.S. Pat. No. 9,168,472:

100 g of a compound having a linear fluoroalkyl group and represented by the Formula (b-1) shown below, 0.1 g of azobisisobutyronitrile serving as a polymerization initiator, and 300 g sample of a solvent, "FS thinner" manufactured by Shin-Etsu Chemical Co., Ltd. (a conventional fluoropolymer diluent; see U.S. Pat. No. 9,254,467) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100,000. A water/oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2{=}CHCOOCH_2CH_2C_6F13 \quad \text{(Formula b-1)}$$

TABLE 1

Data comparison before and after oleophobic treatment of PTFE composite membrane.*

| Sample | Oil rating | Air flux (L/min) | Air flux loss rate |
|---|---|---|---|
| Before oleophobic treatment | 0 | 0.15 | / |
| Example 1 | 8 | 0.105~0.12 | 20%~30% |
| Example 2 | 7 | 0.1125~0.1275 | 15%~25% |
| Comparative Example 1 | 7 | 0.09~0.105 | 30%~40% |

*Representative data accumulated from other batches prepared essentially according to the referenced examples.

Example 3—Weight Gain of Membrane Upon Coating

Using the methodology of the invention, the fluoropolymer compositions of the invention were used to coat poly (tetrafluorethylene) (PTFE) membranes:

| Sample | Membrane area($cm^2$) | Membrane weight (g) | Membrane weight after oleophobic modification (g) | Weight gain per membrane weight(g/g) | Weight gain percentage (%) | Weight gain in per membrane area(g/$cm^2$) |
|---|---|---|---|---|---|---|
| 1# | 75 | 0.5169 | 0.5252 | 0.0161 | 1.6057 | 0.0001 |
| 2# | | 0.5259 | 0.542 | 0.0306 | 3.0614 | 0.0002 |
| 3# | | 0.5187 | 0.5437 | 0.0482 | 4.8197 | 0.0003 |

TABLE 2*

| Sample | Weight Proportion of Fluoronated Monomer | Diluent Solvent | Weight Concentration of Fluropolymer | Oleophbic Level** | Yield | Air Flux Loss Rate |
|---|---|---|---|---|---|---|
| 1 | 30% | Ethyl acetate | 2% | 1 | >92% | 15-20% |
| 2 | 40% | Ethyl acetate | 2% | 3 | >92% | 15-20% |
| 3 | 50% | Ethyl acetate | 2% | 4 | >92% | 15-20% |
| 4 | 60% | Ethyl acetate | 2% | 6 | >92% | 15-20% |
| 5 | 70% | Ethyl acetate | 2% | 6 | >92% | 15-20% |
| 6 | ≥75% | A solvent mixed with ethyl acetate and trifluorotoluene or ethyl acetate and monofluoro-chlorethane | 2% | ≥7 | >92% | 15-20% |
| 7 | ≥98% | Trifluorotoluene or monofluoro-chloroethane | 2% | 8 | >92% | 15-20% |

*The data in Table 2 is representative of accumulated data from multiple experiments.
**According to AATCC Test Method 118-1997

As shown in Table 2 above, as the usage of fluorine-containing monomers approaches 100 weight percent, the resulting fluoropolymer will require increasing amounts of fluoride-containing solvent, such as trifluorotoluene or monofluoro-chloroethane in order to dissolve into solution.

Example 5—Soaking Experiment

In order to verify the stability of the fluoropolymer-coated membranes of the disclosure, the following experiment was conducted:

First, 15 identical poly(tetrafluorethylene) (PTFE) samples which had been treated with the (oleophobic) fluoropolymer of the disclosure (Example 1) and three PTFE samples without this oleophobic treatment, respectively marked as Nos. 1 to No. 18. The samples were tested to record the oleophobic grade before soaking. Next, three different soaking solutions, namely water, ethanol and butyl acetate were utilized and three oleophobic treated PTFE samples and one untreated PTFE which was used as a comparison for each solution. Each sample was taken out after soaking for 48 hours, dried, and subjected to oleophobic testing. Each sample was characterized by FT-IR and Ultraviolet spectra and results are shown in Table 3:

TABLE 3

| Soaking liquid | Oleophobic Level Before Soaking | Soaking for 48 hours FT-IR | UV | Oleophobic Level |
|---|---|---|---|---|
| Water | 7 | No extra peaks* | No extra peaks | 7 |
| Ethyl Alcohol | 7 | No extra peaks | No extra peaks | 7 |
| Butyl Acetate | 7 | No extra peaks | No extra peaks | 7 |

*No extra peaks were observed in the FT-IR and UV spectra after the soaking experiments, evidencing that under the conditions of the treatments, the membrane and its coating were stable, i.e., did not degrade to form other species which would have otherwise been identifiable by infrared or ultraviolet spectral analysis.

Aspects

In a first aspect, the disclosure provides a process for preparing a fluoropolymer, comprising the free-radical polymerization of mono-ethylenically unsaturated monomers, which comprises combining:

a. about 60 to about 100 weight percent of a fluorine-containing monoethylenically-unsaturated monomer; and b. about 0 to about 40 weight percent of a fluorine-free monoethylenically-unsaturated monomer;

under free-radical polymerization conditions, in a solvent comprising at least one solvent having ester moieties, wherein the total weight percent of a. and b. is 100, and allowing the polymerization to proceed to a desired end point.

In a second aspect, the disclosure provides the process of the first aspect, wherein the free radical polymerization conditions comprise the addition of at least one free-radical initiator.

In a third aspect, the disclosure provides the process of the second aspect, wherein the free-radical initiator is a compound chosen from hydrogen peroxide, potassium peroxydisulfate, ammonium peroxydisulfate, potassium persulfate, sodium persulfate, ammonium persulfate, dibenzoyl peroxide, lauryl peroxide, di-tertiary butyl peroxide, 2,2'-azobisisobutyronitrile, t-butyl hydroperoxide, azodiisobutylamidine hydrochloride, and benzoyl peroxide.

In a fourth aspect, the disclosure provides the process of any one of the first to third aspects, wherein the fluorine-containing monoethylenically-unsaturated monomer is chosen from (a) acrylates, (b) ($C_1$-$C_{14}$ alkyl)acrylates, and (c) vinyl esters, having from about 3 to about 33 fluorine atoms.

In a fifth aspect, the disclosure provides the process of any one of the first through the fourth aspects, wherein the fluorine-containing monoethylenically-unsaturated monomer has the formula

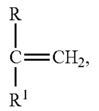

wherein R is chosen from hydrogen or an alkyl group of up to 18 carbon atoms, and $R^1$ is chosen from groups of the formulae:

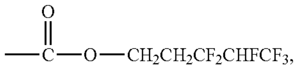

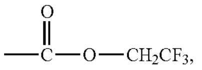

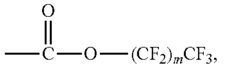

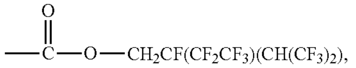

and

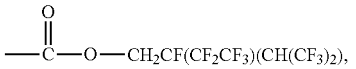

wherein m is 3, 5, 7, 9, 11, 13, or 15.

In a sixth aspect, the invention provides the process of any one of the first through the fifth aspects, wherein the fluorine-containing monoethylenically-free monomer is chosen from one or more of perfluorooctylethylene, perfluorononylethylene, perfluorododecylethylene, perfluorotetradecylethylene, perfluorohexadecylethylene, perfluorooctyl ethyl acrylate, perfluorononyl ethyl base acrylate, perfluorododecyl ethyl acrylate, perfluoro tetradecyl ethyl methacrylate, perfluoro tetradecyl ethyl acrylate, perfluoro hexadecyl ethyl acrylate, perfluorooctylethyl methacrylate, perfluorononylethyl methacrylate, perfluorododecylethyl methacrylate, and perfluorohexadecylethyl methacrylate.

In a seventh aspect, the disclosure provides the process of any one of the first through sixth aspects, wherein the fluorine-containing monoethylenically-unsaturated monomer is chosen from 2-(perfluorooctyl) ethyl acrylate, perfluorononyl ethyl acrylate, perfluorododecyl ethyl acrylate, perfluorotetradecyl ethyl acrylate, perfluorohexadecyl ethyl acrylate, perfluorooctyl ethyl methacrylate, perfluorononyl ethyl acrylate methyl methacrylate, perfluorododecyl ethyl methacrylate, perfluoro hexadecyl ethyl methacrylate.

In an eighth aspect, the disclosure provides the process of any one of the first through seventh aspects, wherein the fluorine-containing monoethylenically-unsaturated monomer is 2-(perfluorooctyl) ethyl acrylate.

In a ninth aspect, the disclosure provides the process of any one of the first through the eighth aspects wherein the fluorine-free monoethylenically-unsaturated monomer is chosen from compounds of the formulae

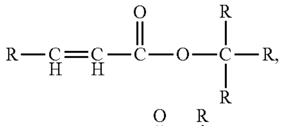

and

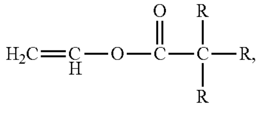

wherein each R is independently chosen from hydrogen or an alkyl group of up to 18 carbon atoms.

In a tenth aspect, the disclosure provides the process of any one of the first through ninth aspects, wherein the fluorine-free monoethylenically-unsaturated monomer is chosen from methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methyl styrene, glycidyl methacrylate, alkyl crotonates, vinyl acetate, vinyl caprylate, di-n-butyl maleate, di-octylmaleate, hydroxyethyl acrylamide, hydroxypropyl methyl acrylamide.

In an eleventh aspect, the disclosure provides the process of any one of the first through tenth aspects, wherein the fluorine-free monoethylenically-unsaturated monomer is chosen from methyl methacrylate, ethyl methacrylate, propyl methacrylate, butyl methacrylate, vinyl acetate, vinyl butyrate, and vinyl caprylate.

In a twelfth aspect, the disclosure provides the process of any one of the first through eleventh aspects, wherein the solvent having ester moieties is chosen from compounds of the formula:

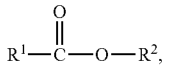

wherein $R^1$ and $R^2$ are independently chosen from (a) $C_1$-$C_{12}$ alkyl, and (b) $C_1$-$C_{12}$ alkyl groups substituted one or more times with a group chosen from halo, nitro, cyano, and alkoxy.

In a thirteenth aspect, the disclosure provides the process of any one of the first through the twelfth aspects, wherein the solvent having ester moieties is chosen from methyl acetate, ethyl acetate, propyl acetate, and butyl acetate.

In a fourteenth aspect, the disclosure provides a fluoropolymer prepared by the process of any one of the first through the thirteenth aspects.

In a fifteenth aspect, the disclosure provides a fluoropolymer which is the free radical polymerization product of monomers comprising, consisting, or consisting essentially of:

a. fluorine-containing monoethylenically-unsaturated monomers chosen from; 2-(perfluorooctyl) ethyl acrylate, perfluorononyl ethyl acrylate, perfluorododecyl ethyl acrylate, perfluorotetradecyl ethyl acrylate, perfluorohexadecyl ethyl acrylate, perfluorooctyl ethyl methacrylate, perfluorononyl ethyl acrylate methyl methacrylate, perfluorododecyl ethyl methacrylate, and perfluoro hexadecyl ethyl methacrylate; and
b. fluorine-free monoethylenically unsaturated monomers chosen from: methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methyl styrene, glycidyl methacrylate, alkyl crotonates, vinyl acetate, vinyl caprylate, di-n-butyl maleate, and di-octylmaleate.

In a sixteenth aspect, the disclosure provides a membrane having at least a partial coating of a fluoropolymer thereon, wherein the membrane exhibits an oil rating according to AATC Test Method 118-1997 of greater than or equal to 6, wherein the fluoropolymer is devoid of halogen atoms chosen from chlorine, bromine, and iodine.

In a seventeenth aspect, the disclosure provides a membrane having at least a partial coating of fluoropolymer thereon, wherein the fluoropolymer is prepared by the process of any one of the first through the thirteenth aspects, wherein the membrane exhibits an oil rating according to AATC Test Method 118-1997 of greater than or equal to 6, and wherein the fluoropolymer is devoid of halogen atoms chosen from chlorine, bromine, and iodine.

In an eighteenth aspect, the disclosure provides the membrane of the sixteenth or seventeenth aspects, wherein the fluoropolymer is prepared from fluorine-containing monoethylenically-unsaturated monomers chosen from;

a. 2-(perfluorooctyl) ethyl acrylate, perfluorononyl ethyl acrylate, perfluorododecyl ethyl acrylate, perfluorotetradecyl ethyl acrylate, perfluorohexadecyl ethyl acrylate, perfluorooctyl ethyl methacrylate, perfluorononyl ethyl acrylate methyl methacrylate, perfluorododecyl ethyl methacrylate, and perfluoro hexadecyl ethyl methacrylate;

and fluorine-free monoethylenically unsaturated monomers chosen from:

b. methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methyl styrene, glycidyl methacrylate, alkyl crotonates, vinyl acetate, vinyl caprylate, di-n-butyl maleate, and di-octylmaleate.

In a nineteenth aspect, the disclosure provides the membrane of the eighteenth aspect, wherein the fluorine-containing monoethylenically-unsaturated monomer comprises, consists, or consists essentially of 2-(perfluorooctyl) ethyl acrylate, and the fluorine-free monoethylenically-unsaturated monomer is chosen from methyl methacrylate, ethyl methacrylate, propyl methacrylate, butyl methacrylate, vinyl acetate, vinyl butyrate, and vinyl caprylate.

In a twentieth aspect, the disclosure provides the membrane of the eighteenth or nineteenth aspect, wherein the exhibits an oil rating according to AATC Test Method 118-1997 of about 7 to 8.

In a twenty-first aspect, the disclosure provides the membrane of the twentieth aspect, wherein the membrane has an air flux of no less than 0.1 liters per minute when passed through a membrane sample having an effective area of about 0.5024 $cm^2$.

In a twenty-second aspect, the disclosure provides the membrane of the twentieth or twenty-first aspect, wherein the membrane exhibits an air flux loss rate of no greater than 30 percent, when compared to a like membrane having no fluoropolymer coating.

In a twenty-third aspect, the disclosure provides the membrane of any one of the eighteenth through twenty second aspects, wherein the membrane is a poly(tetrafluoroethylene).

In a twenty-fourth aspect, the disclosure provides a woven or nonwoven fibrous material coated with the fluoropolymer prepared by the process of any one of the first through the thirteenth aspects.

In a twenty-fourth aspect, the disclosure provides a filter comprising the membrane or fibrous material of any one of the sixteenth through the twenty-fourth aspects.

In a twenty-fifth aspect, the disclosure provides the filter of the twenty-fourth aspect, wherein the filter is a vent filter.

In a twenty-sixth aspect, the disclosure provides a method for purifying a gas, which comprises passing a gas in need of purification through the filter of the twenty-fourth or twenty-fifth aspect.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A process for preparing a fluoropolymer, comprising the free-radical polymerization of monoethylenically-unsaturated monomers consisting of fluorine-containing monoethylenically-unsaturated monomer and fluorine-free monoethylenically-unsaturated monomer, which comprises combining:

a. about 80 weight percent, or greater than 80 and less than 100 weight percent of the fluorine-containing monoethylenically-unsaturated monomer; and b. about 20 weight percent, or greater than 0 and less than 20 weight percent of the fluorine-free monoethylenically-unsaturated monomer;

under free-radical polymerization conditions, in a solvent comprising at least one solvent having ester moieties, wherein the total weight percent of a. and b. is 100, and allowing the polymerization to proceed to a desired end point, wherein the fluorine-free monoethylenically-unsaturated monomer is one or more compounds of the following formulae:

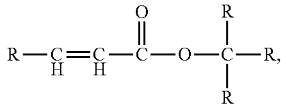
and

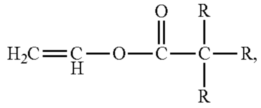

wherein each R is independently chosen from hydrogen or an alkyl group of up to 18 carbon atoms.

2. The process of claim 1, wherein the free radical polymerization conditions comprise the addition of at least one free-radical initiator.

3. The process of claim 2, wherein the free-radical initiator is a compound chosen from hydrogen peroxide, potassium peroxydisulfate, ammonium peroxydisulfate, potassium persulfate, sodium persulfate, ammonium persulfate, dibenzoyl peroxide, lauryl peroxide, di-tertiary butyl peroxide, 2,2'-azobisisobutyronitrile, t-butyl hydroperoxide, azodiisobutylamidine hydrochloride, and benzoyl peroxide.

4. The process of claim 1, wherein the fluorine-containing monoethylenically-unsaturated monomer is chosen from (a) acrylates, (b) ($C_1$-$C_{14}$ alkyl)acrylates, and (c) vinyl esters, having from about 3 to about 33 fluorine atoms.

5. The process of claim 1, wherein the fluorine-containing monoethylenically-unsaturated monomer has the formula

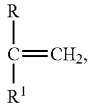

wherein R is chosen from hydrogen or an alkyl group of up to 18 carbon atoms, and $R^1$ is chosen from groups of the formulae:

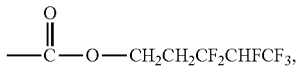
,
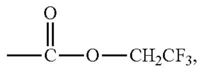
,

-continued

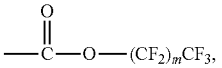

and

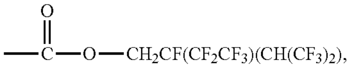

wherein m is 3, 5, 7, 9, 11, 13, or 15.

6. The process of claim 1, wherein the fluorine-containing monoethylenically-unsaturated monomer is one or more compounds chosen from perfluorooctylethylene, perfluorononylethylene, perfluorododecylethylene, perfluorotetradecylethylene, perfluorohexadecylethylene, perfluorooctyl ethyl acrylate, perfluorododecyl ethyl acrylate, perfluoro tetradecyl ethyl methacrylate, perfluoro tetradecyl ethyl acrylate, perfluoro hexadecyl ethyl acrylate, perfluorooctylethyl methacrylate, perfluorononylethyl methacrylate, perfluorododecylethyl methacrylate, and perfluorohexadecylethyl methacrylate.

7. The process of claim 1, wherein the fluorine-containing monoethylenically-unsaturated monomer is one or more compounds chosen from 2-(perfluorooctyl) ethyl acrylate, perfluorononyl ethyl acrylate, perfluorododecyl ethyl acrylate, perfluorotetradecyl ethyl acrylate, perfluorohexadecyl ethyl acrylate, perfluorooctyl ethyl methacrylate, perfluorononyl ethyl acrylate methyl methacrylate, perfluorododecyl ethyl methacrylate, and perfluoro hexadecyl ethyl methacrylate.

8. The process of claim 1, wherein the fluorine-containing monoethylenically-unsaturated monomer comprises 2-(perfluorooctyl) ethyl acrylate.

9. The process of claim 1, wherein the fluorine-free monoethylenically-unsaturated monomer is one or more compounds chosen from methyl acrylate, ethyl acrylate, butyl acrylate, butyl, isobutyl acrylate, ethylhexyl acrylate, octyl acrylate, vinyl acetate, vinyl caprylate.

10. The process of claim 1, wherein the fluorine-free monoethylenically-unsaturated monomer is one or more compounds chosen from, vinyl acetate, vinyl butyrate, and vinyl caprylate.

11. The process of claim 1, wherein the solvent having ester moieties is chosen from compounds of the formula:

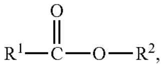

wherein $R^1$ and $R^2$ are independently chosen from (a) $C_1$-$C_{12}$ alkyl, and (b) $C_1$-$C_{12}$ alkyl groups substituted one or more times with a group chosen from halo, nitro, cyano, and alkoxy.

12. The process of claim 1, wherein the solvent having ester moieties is chosen from methyl acetate, ethyl acetate, propyl acetate, and butyl acetate.

* * * * *